US008904274B2

(12) United States Patent
Gnanasambandam et al.

(10) Patent No.: US 8,904,274 B2
(45) Date of Patent: Dec. 2, 2014

(54) IN-SITU MOBILE APPLICATION SUGGESTIONS AND MULTI-APPLICATION UPDATES THROUGH CONTEXT SPECIFIC ANALYTICS

(75) Inventors: Shanmuganathan Gnanasambandam, Victor, NY (US); Eiti Batra, Jersey City, NJ (US)

(73) Assignee: Xerox Corporation, Norwalk, CT (US)

( * ) Notice: Subject to any disclaimer, the term of this patent is extended or adjusted under 35 U.S.C. 154(b) by 565 days.

(21) Appl. No.: 12/780,267

(22) Filed: May 14, 2010

(65) Prior Publication Data
US 2011/0283230 A1 Nov. 17, 2011

(51) Int. Cl.
G06F 17/00 (2006.01)
G06F 3/0481 (2013.01)
H04M 1/725 (2006.01)

(52) U.S. Cl.
CPC ......... H04M 1/72522 (2013.01); G06F 3/0481 (2013.01)
USPC ............................ 715/226; 715/780; 715/810

(58) Field of Classification Search
CPC ..... G06F 3/0484; G06F 3/0481; G06F 3/048; G06F 3/0482; G06F 3/0488; G06F 3/04842; G06F 3/04817
USPC .......................................... 715/780, 810, 226
See application file for complete search history.

(56) References Cited

U.S. PATENT DOCUMENTS

| | | | |
|---|---|---|---|
| 6,542,901 B1 * | 4/2003 | Devine et al. ........................ 1/1 |
| 7,082,576 B2 * | 7/2006 | Shahine et al. ............... 715/789 |
| 7,151,932 B2 * | 12/2006 | Major ......................... 455/435.3 |
| 7,613,692 B2 * | 11/2009 | Hamilton et al. ...................... 1/1 |
| 7,660,779 B2 * | 2/2010 | Goodman et al. ............... 706/48 |
| 2004/0068693 A1 * | 4/2004 | Rawat et al. ................... 715/507 |
| 2005/0125715 A1 * | 6/2005 | Di Franco et al. ............. 715/505 |
| 2005/0197142 A1 * | 9/2005 | Major ............................ 455/466 |
| 2005/0257148 A1 * | 11/2005 | Goodman et al. ............ 715/534 |
| 2006/0075330 A1 * | 4/2006 | Guido et al. ................... 715/507 |
| 2006/0168509 A1 * | 7/2006 | Boss et al. ..................... 715/507 |
| 2008/0098292 A1 * | 4/2008 | Embry ........................... 715/226 |
| 2009/0158135 A1 * | 6/2009 | Dittmar et al. ................ 715/226 |
| 2009/0204881 A1 * | 8/2009 | Murthy et al. ................. 715/226 |
| 2009/0327350 A1 * | 12/2009 | Callahan et al. ........... 707/104.1 |
| 2010/0037219 A1 * | 2/2010 | Chen et al. .................... 717/176 |
| 2010/0100549 A1 * | 4/2010 | Ishida ............................ 707/741 |
| 2010/0161460 A1 * | 6/2010 | Vroom et al. .................... 705/31 |
| 2010/0211863 A1 * | 8/2010 | Jones et al. .................... 715/224 |
| 2011/0087975 A1 * | 4/2011 | Karsten ......................... 715/762 |
| 2011/0131479 A1 * | 6/2011 | Padgett et al. ................ 715/223 |
| 2011/0179126 A1 * | 7/2011 | Wetherell et al. ............. 709/206 |
| 2012/0166411 A1 * | 6/2012 | MacLaurin et al. .......... 707/706 |

* cited by examiner

*Primary Examiner* — Shen Shiau
(74) *Attorney, Agent, or Firm* — Simpson & Simpson, PLLC

(57) ABSTRACT

A system for implementing simultaneous functionality for a wireless communications device (WCD), including a processor for a first specially programmed computer in the WCD for: displaying, on a screen of a GUI for the WCD, a visual representation for a first application; receiving, via the GUI, input data for a plurality of fields for the first application; presenting respective sensory representations of a plurality of applications via the GUI while maintaining the visual representation on the screen; and receiving, via the GUI, respective inputs selecting the applications while maintaining the visual representation. The system includes a processor for a second specially programmed computer processor separate from the WCD for: identifying respective portions of the input data usable by the applications; simultaneously populating the first application and the applications with the input data and the respective portions of the input data, respectively; and implementing the first application and the applications.

14 Claims, 15 Drawing Sheets

|  | EMAIL | TWEET | FACEBOOK | INSTANT MESSAGING | OTHER/COMBINATION | OTHER SOCIAL NETWORKING SITE |
|---|---|---|---|---|---|---|
| FROM | X | X | X | X | X | X |
| TO | X | X | X | X | X | X |
| ATTACHMENT | X | | | | | |
| SUBJECT | X | | | | | |
| BODY/CONTENT | X | X | X | X | X | X |
| LINKS | X | X | X | X | X | X |

FIG. 1

| |
|---|
| DATA<br>\*RELEVANT USER AND/OR USER GROUPS<br>\*INFORMATION/DATA REGARDING THE MESSAGE EXCHANGE, RELEVANT TO THE UNDERLYING APPLICATION<br>\*ASSOCIATED TAGS, FILES, DOCUMENTS |
| MAPPING/OVERLOADING<br>\*OVERLOADS THE UI CONSTRUCTS ACCORDING TO THE UNDERLYING APPLICATION<br>\*NATURAL LANGUAGE PROCESSING TO UNDERSTAND THE OVERLOADED MEANINGS<br>\*QUERIES THE RECORDS ON CLOUD WHENEVER USER STARTS KEYING CHARACTERS INTO THE DIFFERENT FIELDS NAMELY; FROM, TO, SUBJECT, ATTACHMENT, BODY ETC., TO COME UP WITH THE RELEVANT DISTRIBUTION LISTS, ATTACHMENTS, MATCHING SUBJECT LINE PHRASES ETC.<br>\*FROM: SYSTEM OR GROUP OR DISTRIBUTION LIST<br>\*TO: INTENDED AUDIENCE (DISTRIBUTION LISTS, SYSTEM)<br>\*SUBJECT: PREDETERMINED SET OF KEY PHRASES<br>\*ATTACHMENT: MINED FROM BACKEND ANALYTICS<br>\*BODY: ACTION TO BE PERFORMED AND/OR MESSAGE TO BE DELIVERED |
| APPLICATION SUGGESTIONS<br>BASED ON<br>\*TAGS, SUBJECT LINE, ATTACHMENT SET<br>\*USER HISTORY "PERSONAL LOGS"<br>\*ASSOCIATED APPLICATIONS BASED ON OTHER USERS<br>\*DATE, TIME, LOCATION (IF NOTHING AVAILABLE) |
| LAZY BINDING OF APPLICATIONS<br>\*SUGGESTIONS APPEAR PROGRESSIVELY ON THE SCREEN AS MORE INPUT IS PROVIDED OR MORE CONTEXT IS REVEALED (USER ACTIONS)<br>\*FLASHING OF ICONS/ARTIFACTS FOR THESE APPS |
| BACK-END ANALYTICS<br>\*EFFICIENT CONSOLIDATED MULTI-APPLICATION INTERACTION AND ENSEMBLE UPDATES. THE MATRIX INCLUDES THE "MEANS" OF EXCHANGE AND THE ASSOCIATED ATTRIBUTES IN THE ROWS<br>\*ANALYTICS FOR USER SEGMENTATION: PERSON-TO-PERSON APPLICATION PREFERENCES USING MODALITY OF INFORMATION EXCHANGE THROUGH FILES/EMAILS/MESSAGES/TWEETS/FEEDS ABOUT "TAGS" |

FIG. 9A

| |
|---|
| CUSTOMER RELATIONSHIP MANAGEMENT<br>*USE CASE - SENDING MARKETING COLLATERAL/PROMOTIONAL MATERIAL TO ALL THE CUSTOMERS WHO BOUGHT DELL COMPUTERS*<br>*USER:SALESPERSON* |
| *SALESFORCE.COM AND/OR THE DISTRIBUTION LIST INCLUDING THE CONSUMERS THAT BOUGHT DELL COMPUTERS<br>*INFORMATION/DATA REGARDING THE FLYERS FOR DELL PERIPHERALS, INFORMATION ABOUT THE CUSTOMERS, THEIR ACCOUNT DETAILS ETC.<br>*ASSOCIATED TAGS, FILES, DOCUMENTS: CAN BE TAGS AND RELATED DOCS TO "DELL", "DELL PERIPHERALS" ETC. |
| *FROM: SALESFORCE.COM/DELL.COM<br>*TO: DISTRIBUTION LIST OF CONSUMERS WITH DELL DESKTOPS AND LAPTOPS<br>*SUBJECT: DELL PERIPHERAL AND ACCESSORIES (SUBJECT LINE SELECTED FROM THE PRE-DETERMINED LIST)<br>*ATTACHMENT: DELL FLYER SET APPEARS (SALES REP CAN PICK THE APPROPRIATE ATTACHMENT)<br>*BODY: A PROMOTIONAL MESSAGE (THAT IS EDITABLE) |
| *TWEET (USE TWITTER)<br>*RECORD KEEPING ON SALES FORCE (SALES LEADS)<br>*WORKFLOW SUGGESTIONS (EMAIL -> TWEET -> SHAREPOINT) |
| SUGGESTIONS PROGRESSION:<br>1. SUGGEST OTHER TARGETS FOR THE "TO" FIELD<br>2. FLASHING OF ICONS FOR THE APPS ICON FOR TWITTER, FACEBOOK ETC.<br>3. WORKFLOW:TWEET -> SHAREPOINT |
| |

FIG. 9B

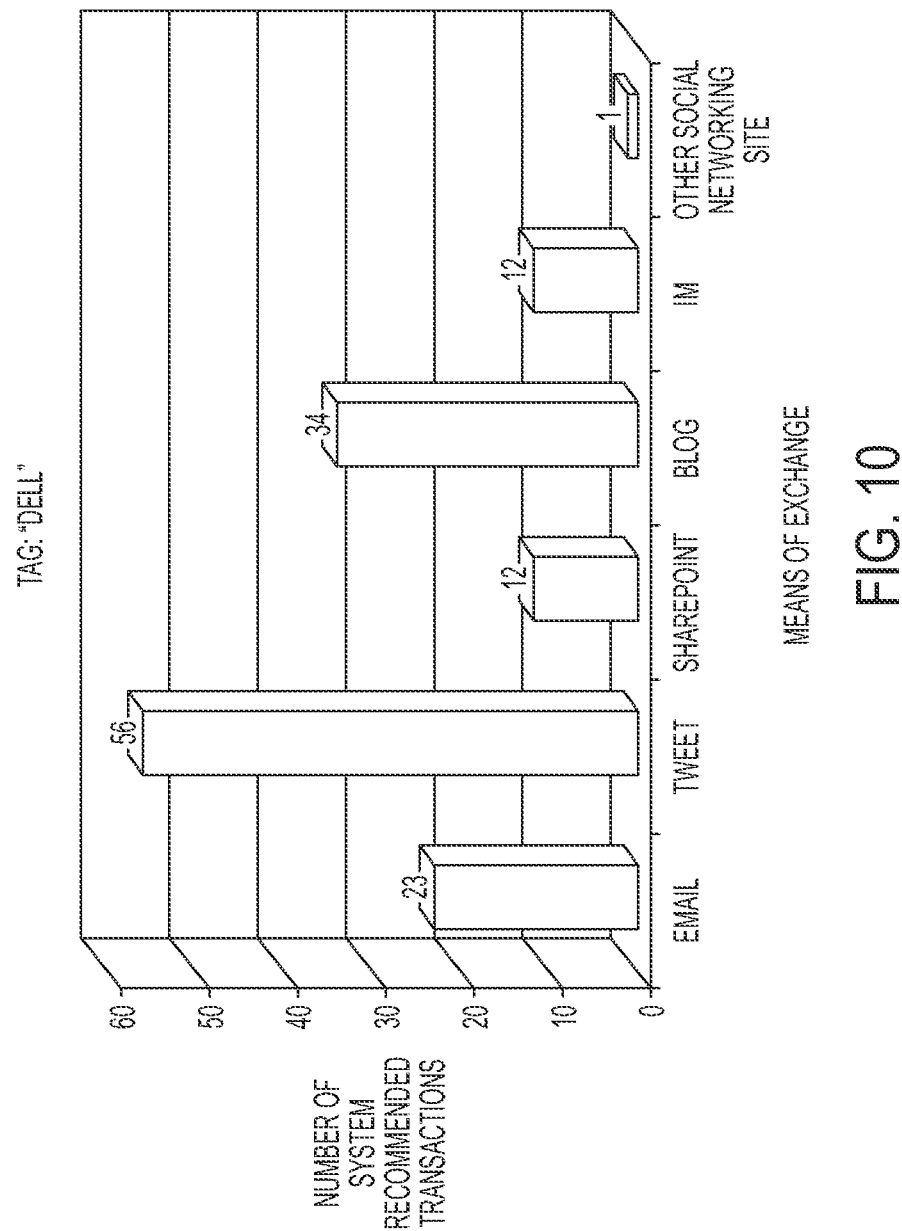

US 8,904,274 B2

IN-SITU MOBILE APPLICATION SUGGESTIONS AND MULTI-APPLICATION UPDATES THROUGH CONTEXT SPECIFIC ANALYTICS

TECHNICAL FIELD

The present disclosure is directed to providing simultaneous functionality using a single screen of a graphical user interface (GUI) for a device. More specifically, the present disclosure is directed to providing simultaneous functionality enabled by two different software programs or devices.

BACKGROUND

With the improvement of the computing power of mobile device, many applications are moving to mobile environments. This trend towards mobile environments has led to the proliferation of a number of different interaction techniques, i.e., human mobile computer interaction or HMCI. Regardless of the ever going set of applications, email remains the most used mobile applications (based on statistics of mobile email adoption in enterprise mobile application from Sybase Survey, 2008).

Due to constraints such as display size, mobile applications are typically directed at a single function, e.g., emailing, blogging, tweeting, etc. Thus, there is a lack of simultaneous multi-application update capability for the mobile environment, i.e., only a single application can occur at a given time within a screen and a separate app is required for each function. It has been found that switching between various small-screen applications may lead to poor performance on PDA class devices, e.g., smart phones.

The limited display sizes in mobile devices in combination with pervasive use of mobile email decreases the likelihood of adoption of other applications each capable of a plurality of functions. Moreover, switching applications in a mobile environment also means that a user can switch to only one other application at a time as the displays are too small to include more than one application within the display at one time. Thus, if a user wants to simultaneously interact with several apps or devices at once they must switch between discreet applications and then access them one at a time.

SUMMARY

According to aspects illustrated herein, there is provided a computer-based method of implementing simultaneous functionality using a single screen of a graphical user interface (GUI) for a device, including: displaying, on a screen of the GUI and using a processor for at least one specially programmed computer, a first visual representation for a first application, the first application including: a first plurality of fields; and at least one first function. The method includes: receiving, via the GUI, input data for the first plurality of fields; identifying, using the processor, a first portion of the input data usable in a second application, the second application different from the first application and including at least one second function different from the at least one first function; presenting, using the processor, a first sensory representation of the second application via the GUI while maintaining the first visual representation on the screen; populating, using the processor, the second application with the first portion of the input data; receiving, via the GUI and while maintaining the first visual representation on the screen, an input selecting the second application; receiving, via the GUI and while maintaining the first visual representation on the screen, a command to implement the first and second applications; and implementing, via the processor, the at least one first and second functions.

According to aspects illustrated herein, there is provided a method of implementing simultaneous functionality using a single screen of a graphical user interface (GUI) for a wireless communications device (WCD), including: displaying, on a screen of the GUI and using a processor for a first specially programmed computer in the WCD, a visual representation for a first application, the first application including a plurality of fields; receiving, via the GUI, input data for the plurality of fields; identifying, using a processor for a second specially programmed computer separate from the WCD, a portion of the input data usable by a second application; presenting, using the processor for the first specially programmed computer, a sensory representation of the second application via the GUI while maintaining the visual representation on the screen; populating, using the processor for the second specially programmed computer, the second application with the portion of the input data; receiving, via the GUI and while maintaining the visual representation on the screen, an input selecting the second application; receiving, via the GUI and while maintaining the visual representation on the screen, a command to implement the first and second applications; and implementing, using the processor for the second specially programmed computer, the first and second applications.

According to aspects illustrated herein, there is provided a method of implementing simultaneous functionality using a single screen of a graphical user interface (GUI) for a (WCD), including: displaying, on a screen of the GUI using a processor for a first specially programmed computer in the WCD, a visual representation for a first application, the first application including a plurality of fields; receiving, via the GUI, input data for the plurality of fields; identifying, using a processor for a second specially programmed computer separate from the WCD, respective portions of the input data usable by a plurality of applications; presenting, using the processor for the first specially programmed computer, respective sensory representations of the plurality of applications via the GUI while maintaining the visual representation on the screen; simultaneously populating, using the processor for the second specially programmed computer, the first application and the plurality of applications with the input data and the respective portions of the input data, respectively; receiving, via the GUI and while maintaining the visual representation on the screen, respective inputs selecting the plurality of applications; receiving, via the GUI and while maintaining the visual representation on the screen, a command to implement the first and second applications; and implementing, using the processor for the second specially programmed computer, the first and second applications.

According to aspects illustrated herein, there is provided a computer-based system for implementing simultaneously functionality using a single screen of a graphical user interface (GUI) for a device, including a processor for at least one specially programmed computer for: displaying, on a screen of the GUI, a first visual representation for a first application. The first application includes: a first plurality of fields; and at least one first function. The processor is for: receiving input data for the first plurality of fields via the GUI; identifying a first portion of the input data usable in a second application, the second application different from the first application and including at least one second function different from the at least one first function; presenting, using the processor, a first sensory representation of the second application via the GUI while maintaining the first visual representation on the screen; populating the second application with the first portion of the input data; receiving, via the GUI and while maintaining the first visual representation on the screen, an input selecting the second application; receiving, via the GUI and while maintaining the first visual representation on the screen, a command to implement the first and second applications; and implementing, via the processor, the at least one first and second functions.

According to aspects illustrated herein, there is provided a system for implementing simultaneous functionality using a single screen of a graphical user interface (GUI) for a wireless communications device (WCD), including a processor for a first specially programmed computer in the WCD for: displaying, on a screen of the GUI, a visual representation for a first application, the first application including a plurality of fields; receiving, via the GUI, input data for the plurality of fields; presenting a sensory representation of the second application via the GUI while maintaining the visual representation on the screen; receiving, via the GUI and while maintaining the first visual representation on the screen, an input selecting the second application; and receiving, via the GUI and while maintaining the visual representation on the screen, a command to implement the first and second applications. The system includes a processor for a second specially programmed computer processor separate from the WCD for: identifying a portion of the input data usable by the second application; populating the second application with the portion of the input data; and implementing the first and second applications.

According to aspects illustrated herein, there is provided a system for implementing simultaneous functionality using a single screen of a graphical user interface (GUI) for a wireless communications device (WCD), including a processor for a first specially programmed computer processor in the WCD for: displaying, on a screen of the GUI, a visual representation for a first application, the first application including a first plurality of fields; receiving, via the GUI, input data for the plurality of fields; presenting respective sensory representations of the plurality of applications via the GUI while maintaining the visual representation on the screen; receiving, via the GUI and while maintaining the visual representation on the screen, respective inputs selecting the plurality of applications; and receiving, via the GUI and while maintaining the visual representation on the screen, a command to implement the first and second applications. The system includes a processor for a second specially programmed computer processor separate from the WCD for: identifying respective portions of the input data usable by a plurality of applications; simultaneously populating the application and the plurality of applications with the input data and the respective portions of the input data, respectively; and implementing the first application and the plurality of applications.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which:

FIG. 1 is a table showing level of detail and overloaded fields as applicable to other non-email applications along dimensions that are typical to email.

FIG. 9 is a flowchart for an example implementation of the CRM embodiment shown in FIG. 4 through 8;

FIG. 10 is a bar graph showing usage patterns for an example salesperson; and,

DETAILED DESCRIPTION

Figure 2:
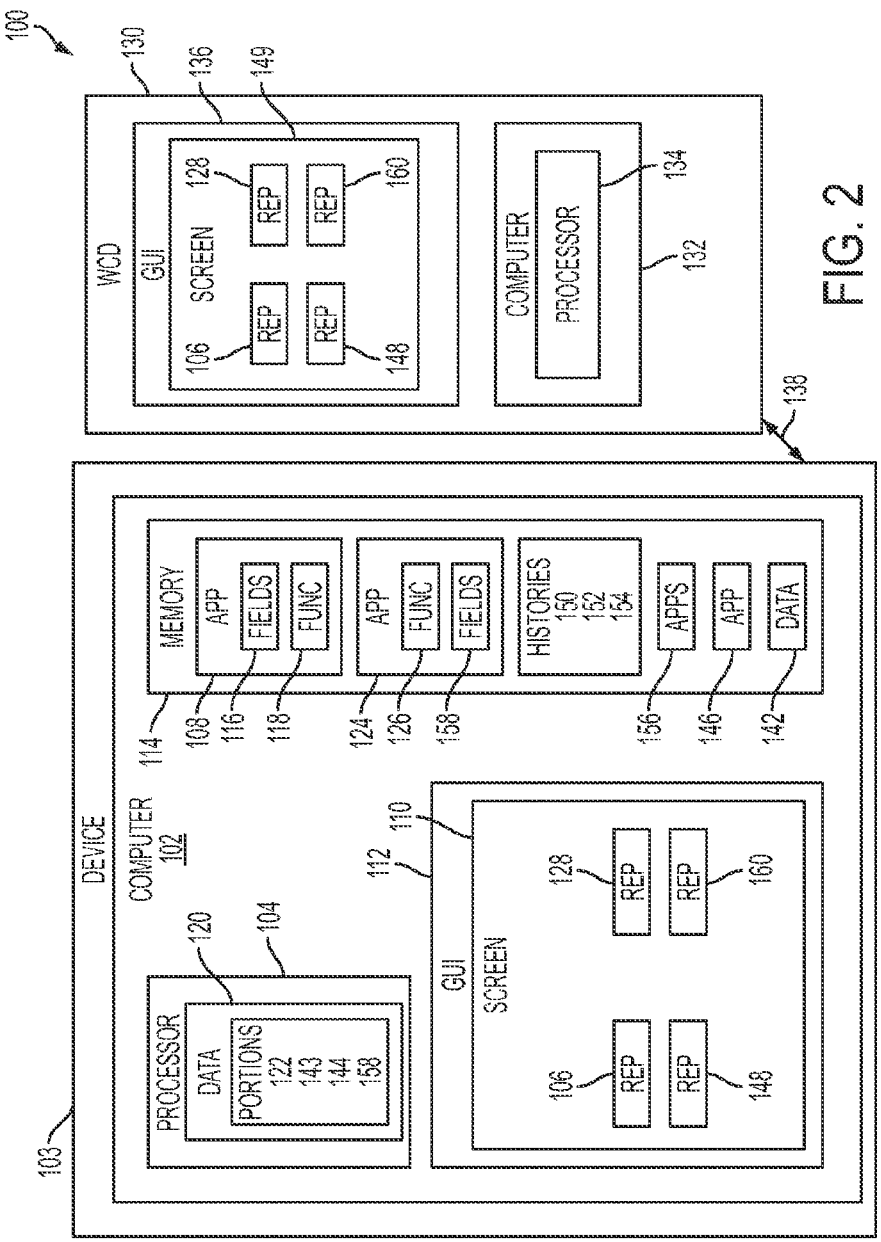
FIG. 2 is a block diagram of a computer-based system for implementing simultaneously functionality using a single screen of a graphical user interface for a device.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, the following terms are intended to be broadly construed as follows:

Application: one or more functions.

Function: a series of computer executable commands.

In-Situ Application Suggestion and Lazy (Suggestion) Binding: A link, icon, connected graph of icons, flashing link, sensory representation, or artifact that is suggested dynamically after the primary application loads in response to context, the current user or other users. The term lazy is used to denote that suggestions appear progressively after context is expressed by the user.

Internet: includes the world wide web and the network that is accessible by the public that includes a network of interconnected computers that transmit data using, for example, Internet Protocol (IP). In some aspects, certain private networks, including virtual private networks (VPN) may be included in the definition of the Internet.

GUI: includes a graphical user interface, or other means of providing communications from or to an end user, including via graphics, text, audio, video, data input, such as voice, typing, touch screen, or other means of input or output to/from any device, including a WCD, or other computing devices. Such GUI may include information and/or actions that are available for viewing, use or interaction with an end user.

Multi-Application Update or Ensemble Update: FIG. 1 is a table showing level of detail and breadth of intended audience along dimensions that are typical to email. Suppose a user is communicating a particular topic using several applications. One can observe that amongst the multitude of applications that may help in information dissemination, the level of detail or the breadth of recipients chosen may vary. Some are to a pointed audience as in email where as others such as social networking platforms may be to a broader audience, with blogs perhaps being even wider. Tabulating the preceding applications along the dimensions or attributes of email as in FIG. 1, patterns typically emerge for a given user and given communication type. Such patterns may be used, in some embodiments, with explicit user configuration, to update multiple applications in one shot, that is, simultaneously. This multi-application update is also termed ensemble (of applications) update. Note that applications chosen for ensemble updates must inherently have some similarities.

Output function: a function the execution of which entails interfacing with an application outside of the application including the function or which entails interfacing with a system or component outside of the system or component implementing the function. An outside function may involve the transmission of information, for example, via remove connectivity. An operation may be performed on the information prior to the transmission.

Overloading user-interface (UI) constructs: A chosen UI element such as the "From," "To," "Attchmt(s)," "Subject," and "Body," fields in an email-like application can be overloaded to mean/cause other outcomes in other applications used in various embodiments. In this disclosure, email is used as an example for UI overloading owing to its unique and popular place among mobile users. However, it should be understood that other applications can be overloaded.

PDA: includes a personal digital assistant, such as Palm Pilot, smart phones, tablet devices, e-readers, wireless music devices and any other personal computing device, which includes at least one of a display, processor, memory or input or output means.

Remote Connectivity: any method used by a computing device to communicate with other devices or networks including, but not limited to the Internet, Satellite networks, Cell Phone networks, other wireless networks and standards such as 802.11, 80211.b, 802.11g, or similar wireless LAN operating standards, or Bluetooth technologies, infrared connections, or any other similar technologies or other technologies such as those described above that permit the sending and/or receiving and/or processing of electronic information in either an encrypted or unencrypted format.

Sensory representation: a visual, auditory, or tactile output such as a graphic display, a tone, or a vibration.

Wireless Communications Device (WCD): a communications device that receives or transmits via a non-wired medium, such as radio frequency. A WCD can include, but is not limited to an AM or FM radio device, a television, cell phones, portable phones, and devices, such as laptop computers and PDAs interfaced with a wireless network, for example, a LAN. Applicable formats, standards or protocols, include Ethernet (or IEEE 802.3), SAP, ATP, Bluetooth, and TCP/IP, TDMA, CDMA, 3G and 4G.

Furthermore, as used herein, the words "printer," "printer system", "printing system", "printer device" and "printing device" as used herein encompasses any apparatus, such as a digital copier, bookmaking machine, facsimile machine, multi-function machine, etc. which performs a print outputting function for any purpose, while "multi-function device" and "MFD" as used herein is intended to mean a device which includes a plurality of different imaging devices, including but not limited to, a printer, a copier, a fax machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, a server, one or more personal computers, a standalone scanner, a mobile phone, an MP3 player, audio electronics, video electronics, GPS systems, televisions, recording and/or reproducing media or any other type of consumer or non-consumer analog and/or digital electronics.

Moreover, although any methods, devices or materials similar or equivalent to those described herein can be used in the practice or testing of these embodiments, some embodiments of methods, devices, and materials are now described.

FIG. 2 is a block diagram of computer-based system 100 for implementing simultaneously functionality using a single screen of a graphical user interface for a device. System 100 includes at least one specially programmed computer 102 for device 103. The computer includes processor 104 for displaying visual representation 106 for application 108 on screen 110 of GUI 112. In one embodiment, the application is stored in memory unit 114 of the computer. It should be understood that the computer can obtain application 108 from outside of the computer. The preceding is applicable to applications described infra. Application 108 includes plurality of fields 116 and at least one function 118.

The processor receives input data 120 for fields 116 via the GUI using any means known in the art. In one embodiment, the visual representation is used to input the data, for example, a user types the data into fields displayed in the representation. However, it should be understood that other methods, such as verbal input from a user, can be used to receive data. The preceding discussion is generally applicable to discussions infra regarding input to a GUI.

The processor identifies portion 122 of the input data usable in application 124. In one embodiment, application 124 is different from application 108 and includes at least one function 126 different from function 118. In one embodiment, application 124 is stored in memory unit 114 of the computer. The processor presents sensory representation 128 of the application 124 via the GUI while maintaining representation 106 on the screen. This process is referred to as "lazy suggestion binding" and is further discussed supra and infra. In FIG. 2, representation 128 is shown as a visual display on the screen; however, it should be understood that representation 128 could be auditory or tactile instead of visual or in addition to visual. The processor populates application 124 with portion 122 of the input data. The processor receives, via the GUI, an input selecting application 124 while representation 106 is maintained on the screen. The processor receives, via the GUI, a command to implement applications 108 and 124 and, in response, implements functions 118 and 126. In one embodiment, implementing functions 118 and 126 includes simultaneously transmitting input data 120 and portion 122 of the input data.

In one embodiment, the system includes wireless communications device (WCD) 130 separate from computer 102. The discussion that follows is directed to system 100 including the WCD; however, it should be understood that the discussion also is applicable to system 100 without the WCD. That is, the components and functionality described for system 100 including the WCD are applicable to system 100 without the WCD.

The WCD includes specially programmed computer 132 with processor 134 for displaying representation 106 and receiving input data 122 via GUI 136. Processor 134 also is for presenting representation 128 via GUI 136 and receiving the input to select application 108 and the command to implement the applications and functions. Processor 104 identifies portion 122, populates application 124, and implements functions 118 and 126 as described supra.

Computer 102 can be any computer or plurality of computers known in the art. A WCD is defined supra. WCD 130 can be any WCD known in the art. In general, the WCD communicates with device 103 via radio-frequency connection 138.

In one embodiment, processor 102 is for: modifying function 118 to create function 126; and selecting, using portion 122 and respective descriptions of how applications 108 and 124 work, additional data 142 applicable to application 124, and populating application 124 with the additional data. For example, data 142 may be attachments. In one embodiment, data 142 is stored in memory 114; however, it should be understood that system 100 can interface with other system to obtain the data. In one embodiment, functions 118 and 126 operate differently on portion 122. In one embodiment, processor 102 modifies portion 143 of data 120 and populates application 124 with portion 143. The preceding operations are further described infra in the context of overloading.

In one embodiment, processor 102 is for identifying, responsive to the second application, portion 144 of the input data usable in application 146. In one embodiment, application 146 is stored in memory unit 114. Processor 134 presents sensory representation 148 for application 146 via GUI 136 while maintaining representation 106 on screen 149 of the GUI. Representation 148 is shown as a visual representation; however, it should be understood that representation 148 can be other than visual, for example, auditory or tactile. Processor 102 populates application 146 with portion 144, receives, via GUI 136, input selecting application 146 while maintaining representation 106 on screen 149 of the WCD. Processor 102 receives a command to implement application 146 via GUI 136 and implements application 146 in response.

In one embodiment, processor 134 displays representation 106 on one portion of the screen and presents representation 128 as a visual representation on a different portion of the screen. In one embodiment, processor 102 is for accessing history 150 of interactions of a user, for example, a current or past user of the WCD, with application 108 or 124. In one embodiment, processor 102 is for accessing history 152 of data usage by application 108 or 124. In one embodiment, processor 102 is for accessing a history 154 of interactions of a plurality of users, for example, a current user or past users of the WCD, with application 108 or 124. The processor identifies portion 122 using one, some, or all of the histories. It should be understood that the histories described above can be with respect to other numbers of applications associated with system 100. In one embodiment, some or all of the histories are stored in memory 114. However, it should be understood that system 100 can obtain some or all of the histories from outside of the system.

In one embodiment, system 100 includes a plurality of applications, for example, applications 156. In one embodiment, applications 156 are stored in memory unit 114 of the computer. Processor 102 is for identifying respective portions 158 of the input data usable by each application 156 and presenting, via GUI 136, respective sensory representations 160 (shown as visual representations) of each application while maintaining representation 106 on screen 152. Representations 160 are shown as visual representations; however, it should be understood that some or all of representations 160 can be other than visual, for example, auditory or tactile. Processor 102 populates applications 156 with portions 158 prior to receipt, via GUI 136, of an input selecting an application from applications 156. That is, the system provides dynamic and simultaneous updating of applications as data is entered. This functionality is referred to as ensemble updates or multi-application updates and is described infra and supra.

In one embodiment, processor 102 receives, via GUI 136, respective inputs selecting some or all of applications 156 while maintaining representation 106 on screen 149, and implements the selected applications.

In one embodiment, application 124 includes plurality of fields 158 and processor 102 is for receiving, via GUI 136 and in a temporal sequence, respective portions of data 120 while maintaining representation 106 on screen 149. The processor identifies, in the same temporal sequence in which the data was received, respective fields 158 in which the respective portions of input data are usable, from while maintaining representation 106 on screen 149. Processor 102 populates, in the temporal sequence, the respective fields 158 with the respective portions of input data and presents, in the temporal sequence, sensory representations 160, via GUI 136, of the respective fields 158 while maintaining representation 106 on screen 149. Representations 160 are shown as visual representations; however, it should be understood that some or all of representations 160 can be other than visual, for example, auditory or tactile. Thus, the system dynamically updates applications in the background as input is added to the system. This functionality is referred to as ensemble updates or multi-application updates and is described infra and supra.

Applications usable with system 100 can be any applications known in the art. In one embodiment, the applications include, but are not limited to: email applications, blog applications, text message applications, instant messaging applications, or social networking platform applications.

System 100 dynamically captures context and in response suggests and lazily places mobile, or WCD, applications in-situ without a user needing to change to a different mobile application, as described infra and supra. Constantly switching screens on mobile, or WCD, platforms in response to the user's context may lead to poor performance. In one embodiment, the initial application is an email application and the system capitalizes on a trend in which email is the application of choice in the enterprise mobile domain. As further described below, the system uses overload constructs in the email user-interface to perform other kinds of applications or work.

Overloading enables activities, beyond an initially displayed application, within the popular email-like environment. Interface overloading typically involves interpretation and analytics which is carried in a backend cloud. Analytics for system 100 identify applications by observing context, for example, patterns discerned from user histories 150 and 152 and relevance to workflow and environmental details that a mobile device can pick up. In one embodiment, applications such as application 124 are suggested through representations such as representations 128, this process is less obtrusive than automatic application switching, which requires switching between displays for the different applications. Furthermore, as noted above and further described infra, system 100 provides ensemble updating and/or a simultaneous multi-application interaction/update capability that is efficient from the data-transmission standpoint.

In one embodiment, device 103 is a multi-function device (MFD) and some or all of applications 108, 124, 146, and 156 are related to printing operations. For example, fields in the applications are regarding printing parameters and data, such as data 120, includes printing parameters and values for those parameters. For example, application 108 may include fields regarding printing of a greeting card, for example, subject of the card, design of the card, and recipient of the card. Suggestions, such as application 124, could include access to other designs based on the user's history with printing cards for the particular subject or recipient, or other user's histories regarding printing cards for the particular subject, similar to histories 150 and 152. Thus, system 100 enables simultaneous use of the WCD and the MFD via a single device, the WCD.

As an example, the MFD can be authenticated by through entering a verification code or some other identification data from a portion of an email-like screen on the WCD. The overloading could be implemented as follows:

"from" field is authentication for email. Authentication for MFD use could be by combining location from phone and location information from MFD.

"to" field is archive destination from WCD, for example, the printing location for MFD.

"attachment" field is used to obtain archived data through an email-like application on phone, for example, information to be printed by the MFD.

Figure 3:
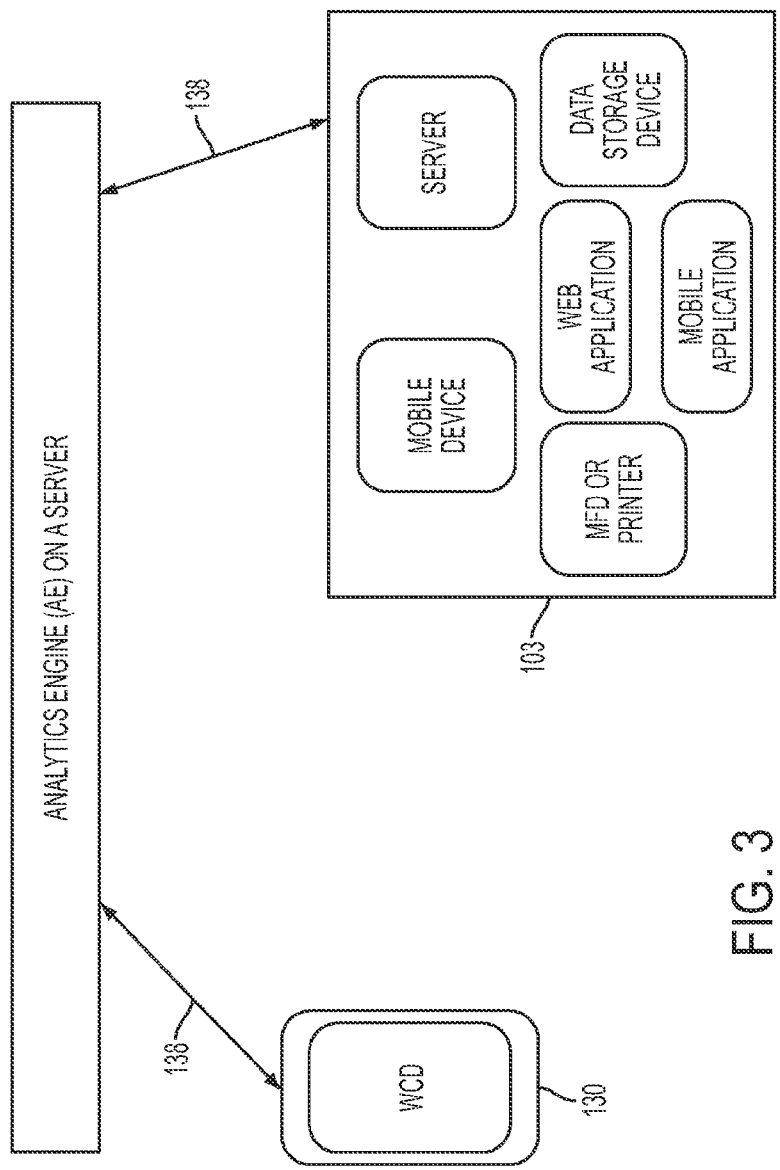
FIG. 3 is a block diagram of a computer-based system for implementing simultaneously functionality between a wireless communications device (WCD) and a multi-function device using a single screen of a graphical user interface for the WCD.

FIG. 3 is a block diagram of computer-based system 100 for implementing simultaneously functionality between a wireless communications device (WCD) and a multi-function device using a single screen of a graphical user interface for the WCD. In general, the discussion regarding FIG. 2 is applicable to FIG. 3. However, the "back end" analytics are performed by separate server 170 connected to the WCD by radio-frequency connection 138. Server 170 performs the back end analytics and then transfers data and commands to device 103, for example, via radio-frequency connection 138.

Examples of the back end analytics include, but are not limited to: identifying portion 122 of the input data usable in application 124; populating application 124 with portion 122 of the input data; implementing functions 118 and 126; modifying function 118 to create function 126; selecting, using portion 122 and respective descriptions of how applications 108 and 124 work, additional data 142 applicable to application 124; and populating application 124 with the additional data.

Examples of the back end analytics include, but are not limited to: modifying portion 143 of data 120 and populates application 124 with portion 143; identifying, responsive to the second application, portion 144 of the input data usable in application 146; receiving a command to implement application 146 via GUI 136 and implementing application 146 in response; accessing histories 150, 152 and 154; identifying portion 122 using one, some, or all of the histories. Examples of the back end analytics include, but are not limited to: identifying respective portions 158 of the input data usable by each application 156; populating applications 156 with portions 158; identifying, in the same temporal sequence in which the data was received, respective fields 158 in which the respective portions of input data are usable; populating, in the temporal sequence, the respective fields 158 with the respective portions of input data.

The present disclosure includes an in-situ application suggestion concept, which capitalizes on the popularity of email as a mobile application. Further, ensemble updates or multi-application updates, in which a collection of interlinked applications in a niche are simultaneously updated for purposes of data transmission efficiency and briefer exposure to small WCD screens.

The present disclosure includes the following broad elements: (a) overload constructs in the popular email environment to mean and cause different, but perceivably similar, outcomes in other application domains; and (b) suggest context sensitive applications (through sensory representations) in situ (i.e. within the email-like app). In one embodiment, outcomes require prior configuration for the user to control the multi-application interaction and are implementable in other PC-like environments.

FIGS. 4 through 8 are photographs of respective screens illustrating example operation of a computer-based system for implementing simultaneously functionality using a single screen of a graphical user interface for a device. The following should be viewed in light of FIGS. 2 through 8. Operation of a computer-based system for implementing simultaneously functionality using a single screen of a graphical user interface for a device is illustrated in the context of a customer relationship management (CRM) embodiment in FIGS. 4 through 8; however, it should be understood that a computer-based system for implementing simultaneously functionality using a single screen of a graphical user interface for a device is not limited to just CRM.

In one embodiment, applications described herein are in the bottom tiers of adoption in the mobile world in spite of these applications being otherwise popular. However, it should be understood that applications usable with system 100 are not limited to those explicitly described herein. The goal of the CRM embodiment is to efficiently view, respond to, and update multiple applications from within the same screen making use of constructs such as: a) contextual application suggestions and lazy suggestion binding; b) ensemble updates; and c) overloaded user interaction elements with an email-like experience.

Figure 4:
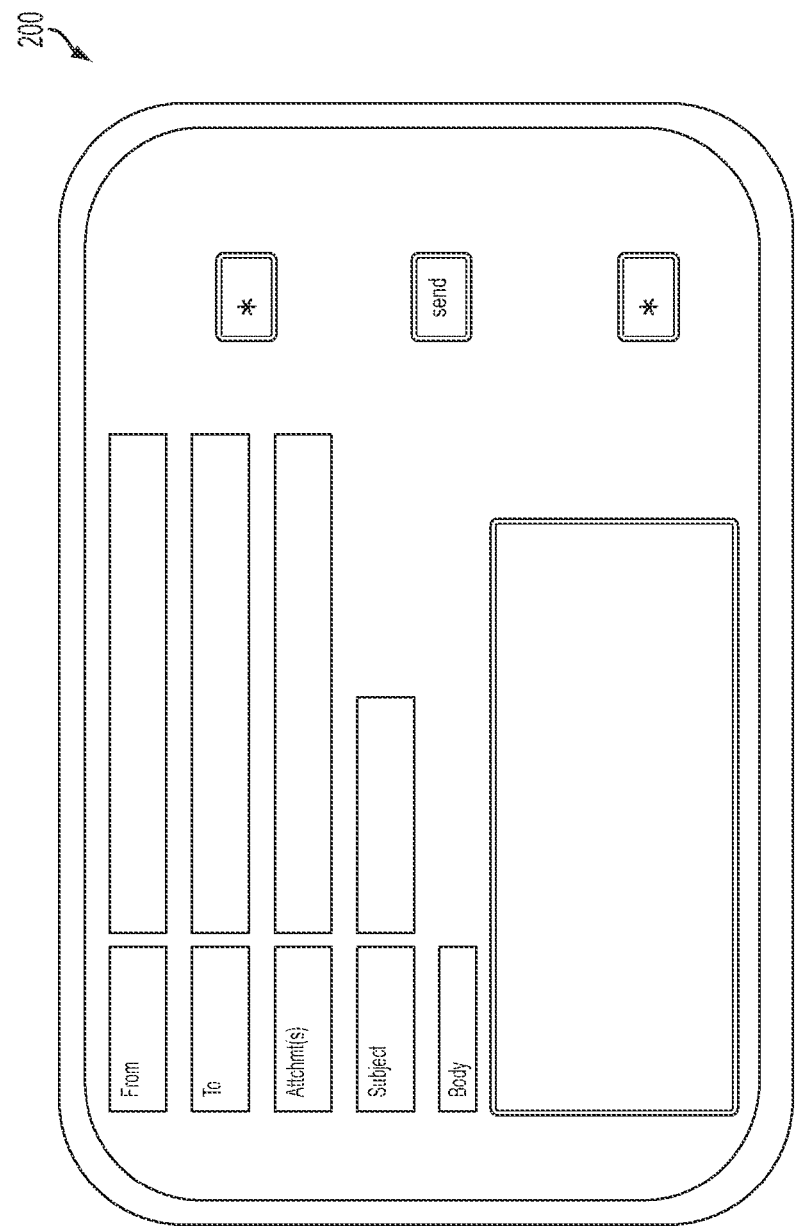
FIGS. 4 through 8 are photographs of respective screens illustrating example operation of a computer-based system for implementing simultaneously functionality using a single screen of a graphical user interface for a device.

FIG. 4 shows initial screen 200 for the CRM embodiment, for example, representation 106, which has an email look and feel. Using this screen, a user can search, target and send selected messages and collateral to customers who have bought merchandise before, typical tasks in CRM. In-situ application suggestions, such as application 124, bind to the user's application in a lazy fashion. The screen includes fields "From," "To," "Attchmt(s)," "Subject," and "Body," all of which are typical for an email application. It should be understood that other fields could be included in the display.

Figure 5:
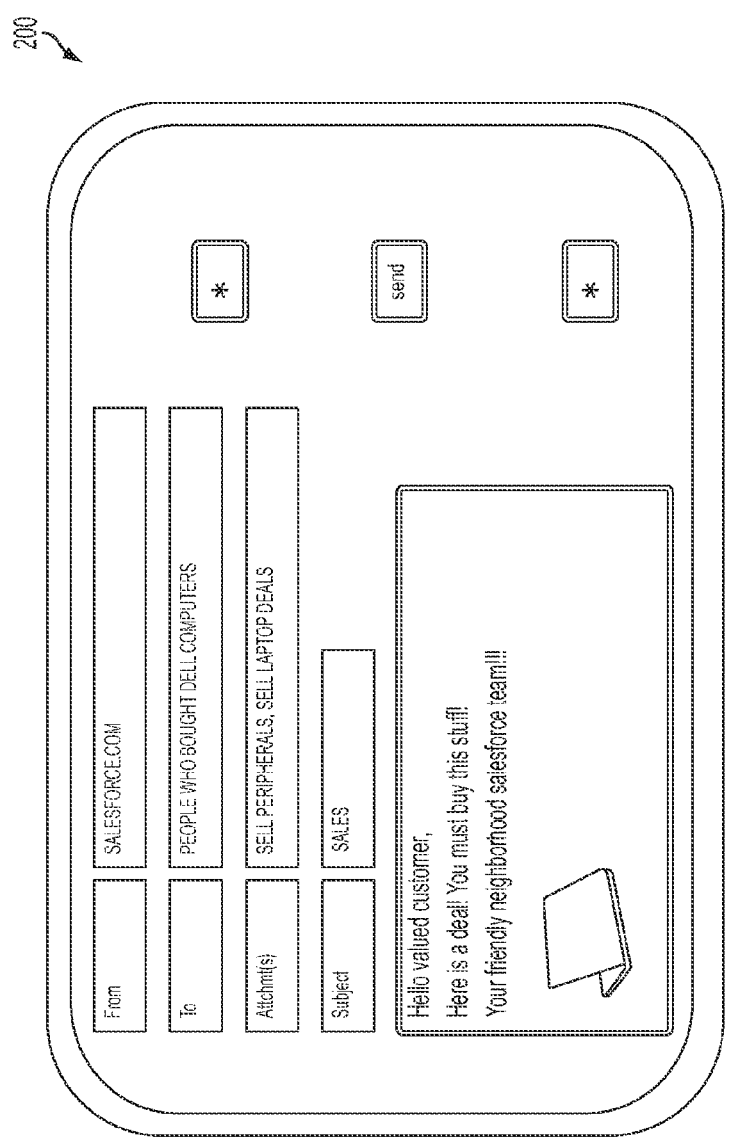

To generate the screen in FIG. 5, the user has entered data, for example, data 120, in the "From" and "Attchmt(s)" fields. In this case, the entry in the "Attchmt(s)" field is treated as a search term by the system's back end analytics. In response to the entered data, the system, for example, processor 104, performs back end analytics such as data mining and generating and analyzing user and application histories. The system enters the data shown in the remaining fields based on the back end analytics. Any field is user configurable to be a search field. That is, the value of that field can be searched against archived data or named content repositories.

Figure 6:
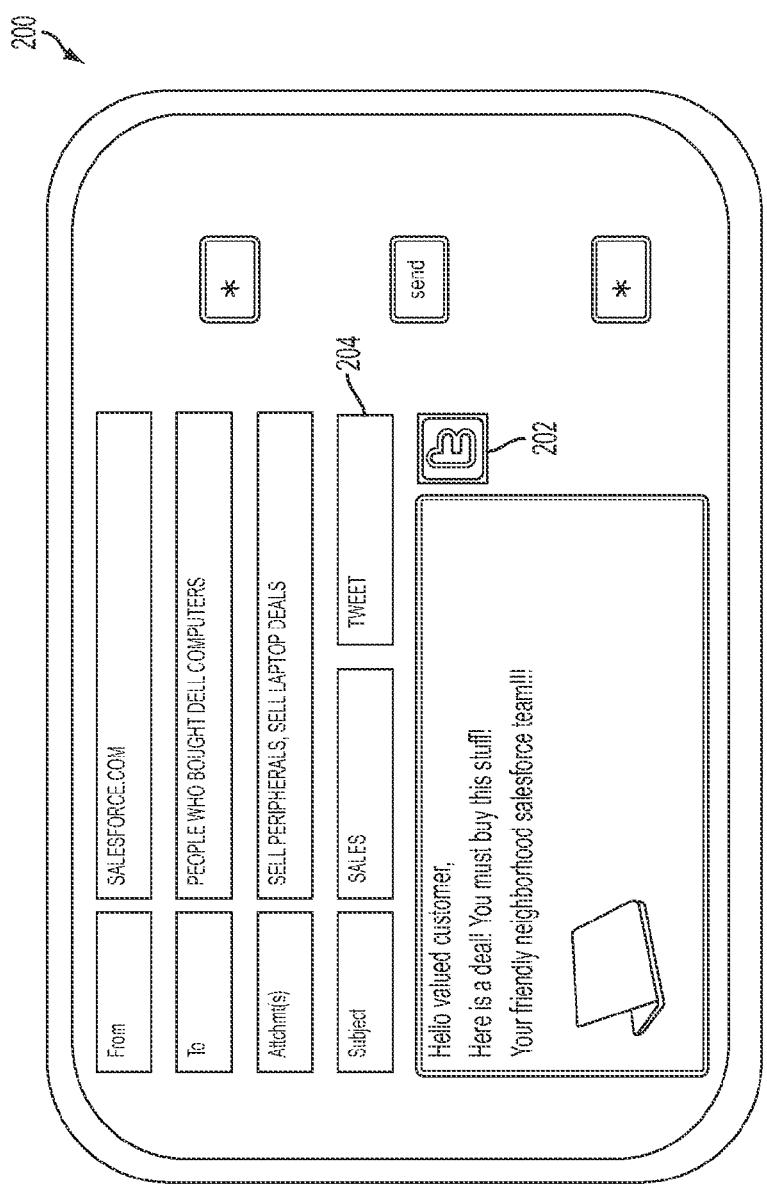

In FIG. 6, the system has presented two sensory representations, for example, icon 202 and a text entry in field 204, in response to the back end analytics noted above. Icon 202 and the text entry are for respective suggested/related social networking platform applications.

Figure 7:
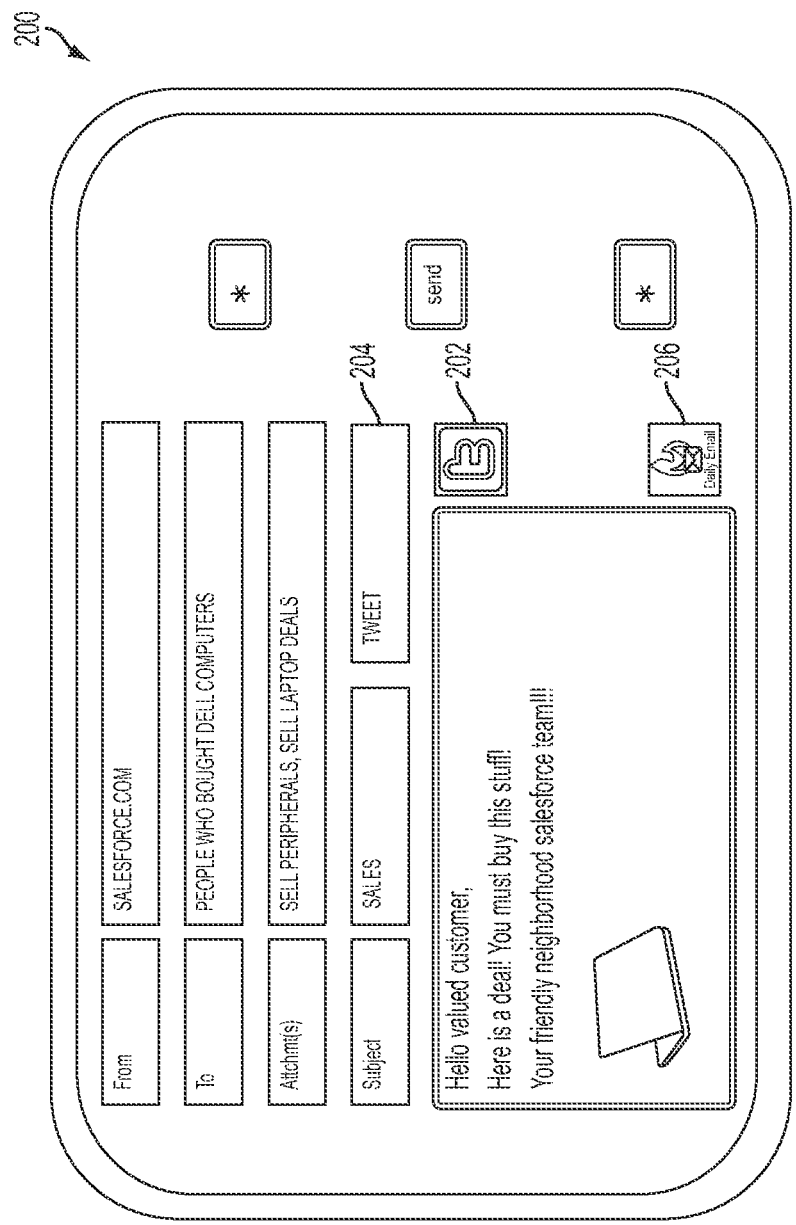

In FIG. 7, the system has performed further back end analytics, has identified another suggested/related application, a daily email application, and has presented icon 606 for the application.

Figure 8:
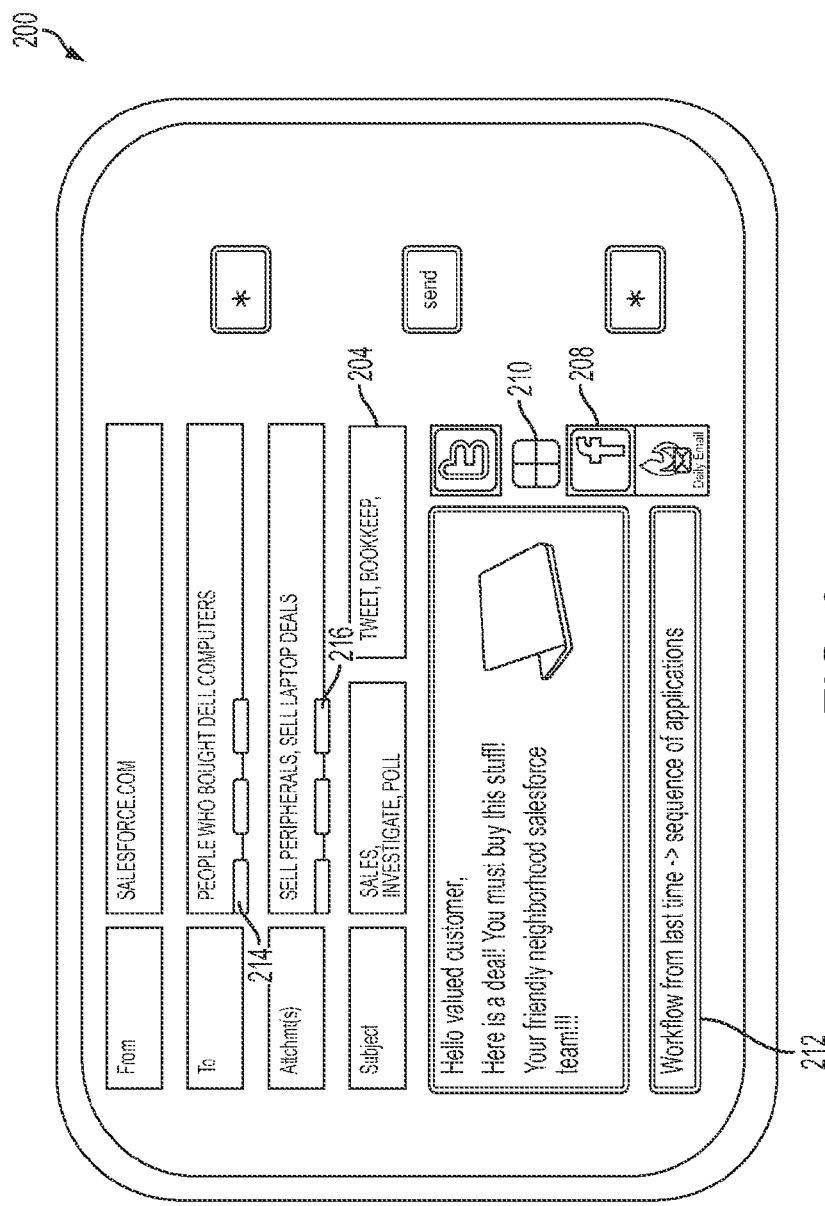
Figure 11A:
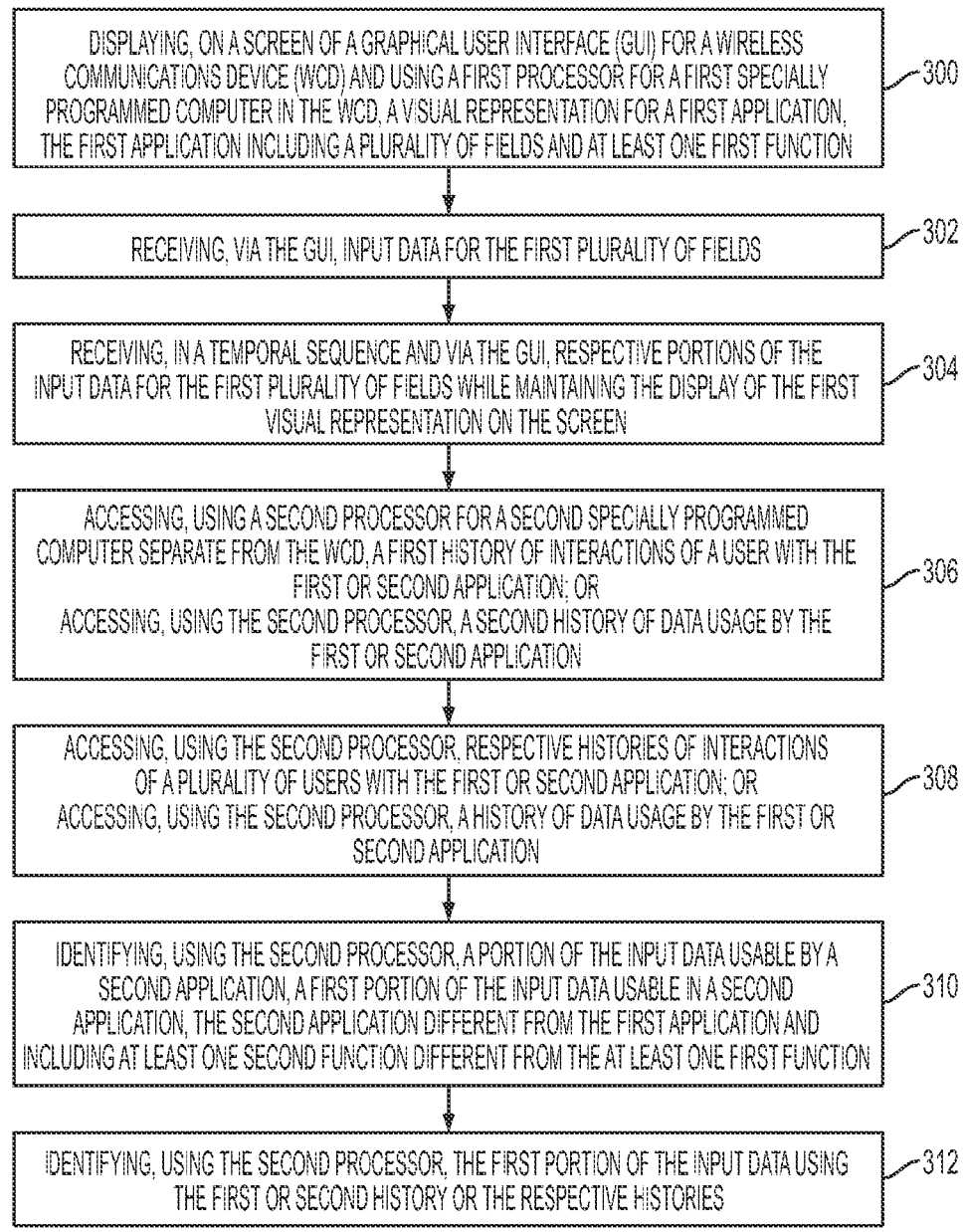
FIGS. 11A-11D are a flowchart of a method of implementing simultaneously functionality using a single screen of a graphical user interface for a device.
Figure 11B:
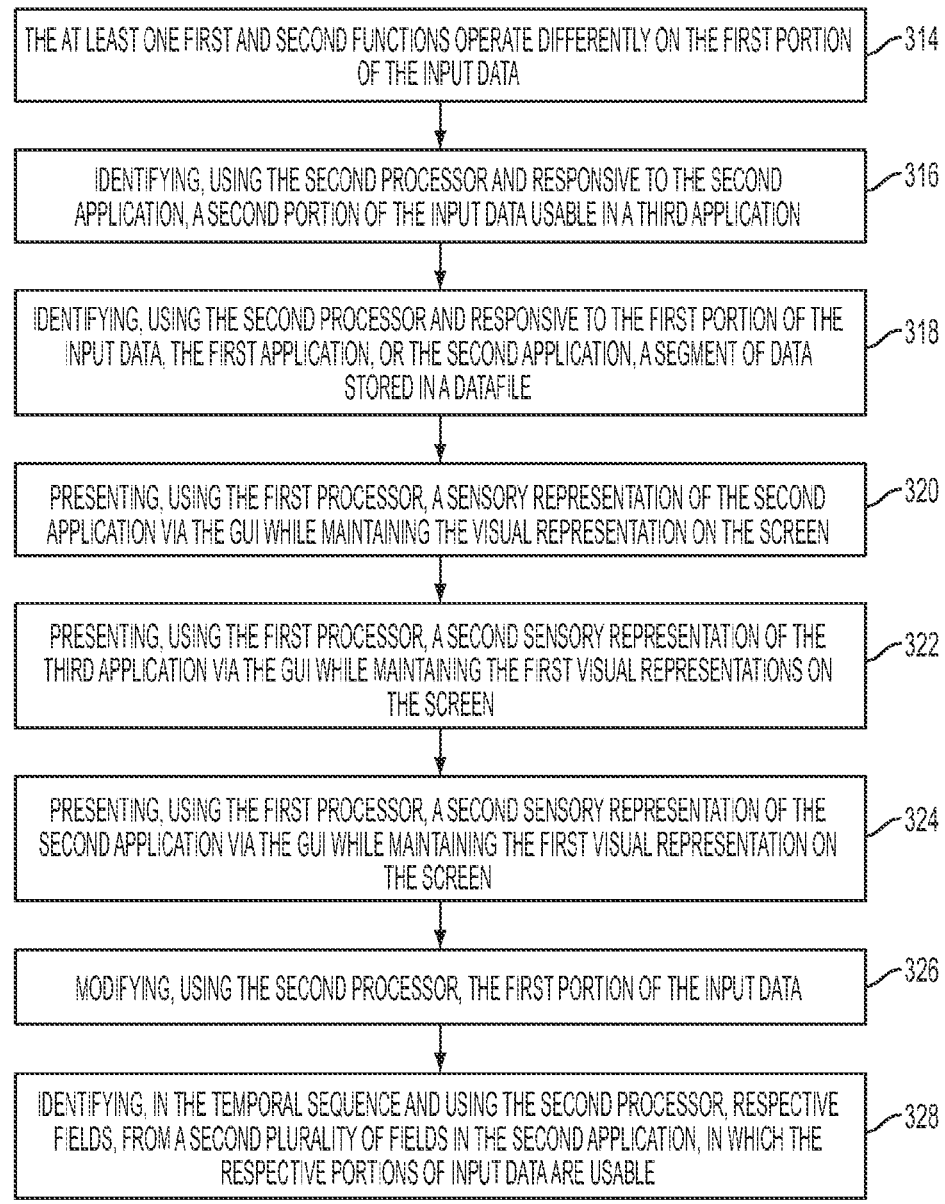
Figure 11C:
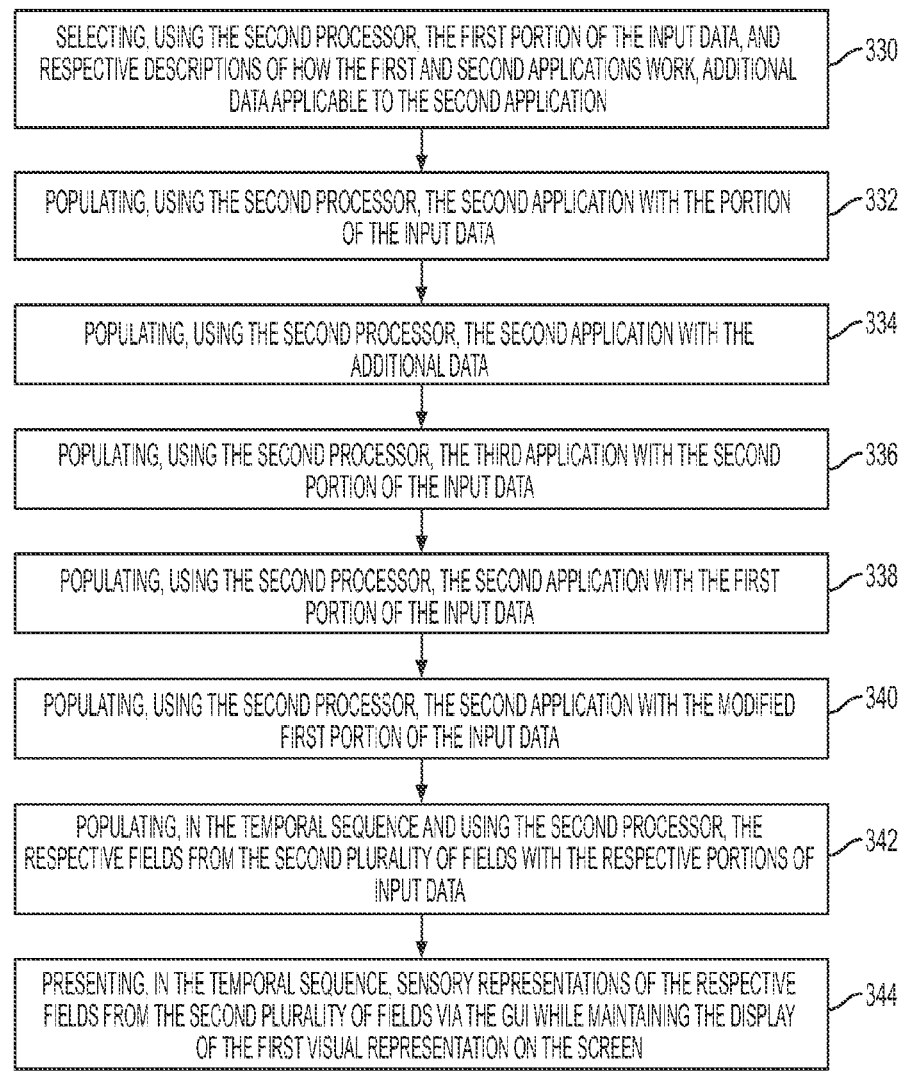
Figure 11D:
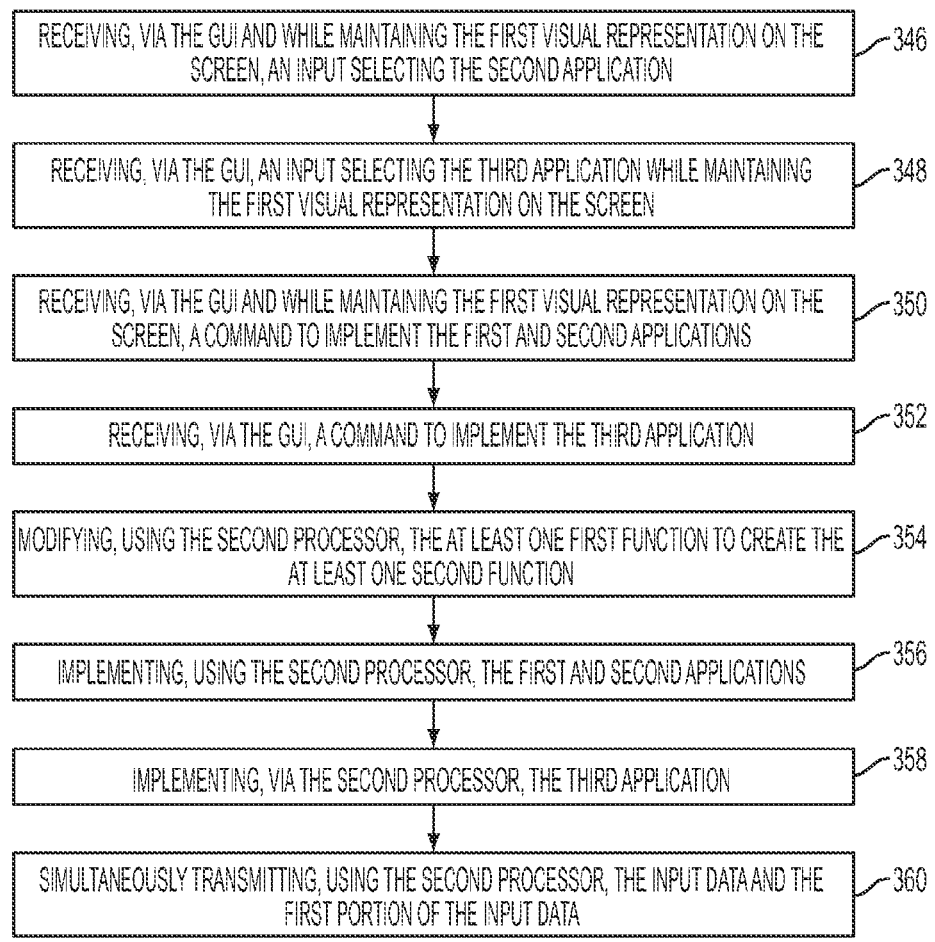

In FIG. 8, the system has performed further back end analytics, has identified further suggested/related applications or actions, and has presented respective representations. Specifically, icon 208 has been displayed for a social network platform, icon 210 has been displayed for a bookmarking application, and "Bookkeep" and "Sharepoint" data applications have been added to field 204, and workflow sequence 212 has been added. In addition icons 214 and 216 have been added to the "From" and "Attchmt(s)" fields. These icons provide addition options regarding the entries in those fields, for example, subsets of the entries.

The following discussion provides further detail regarding the operations illustrated in FIGS. 2 through 8. In one embodiment, application suggestions such as application 124 are a direct result of mining that is performed both in real-time and offline to generate and present the suggested applications at run-time. These suggestions are called in-situ application suggestions as screen 200 does not change and the suggestions take their places at designated spots within the same screen 200. Advantageously, this simultaneous presentation precludes switching between respective screens for different applications, for example, on a WCD. As explained infra, attachments, file-names, subject lines, and/or histories such as histories 150, 152, and 154 can be used.

In one embodiment, the following are used to suggest applications or meta-data there-of: applications/icons/images which upon selection overload the already present functionality on the screen; tags or actions words mined from the sources noted above to passive remind the user of such functionality; or workflow suggestions from previous patterns of the current user or previous patterns of other users. Workflow suggestions can an ordered set of actions related to suggested applications.

The system uses overloading of user interface constructs to identify and implement related applications, such as application 124. For example, a salesperson searches or leverages past actions by them self or others like them by entering, in the screen of FIG. 5, searches, keywords etc. in fields of representation 106, which appear to be common email inputs such as "From," "To," "Attchmt(s)," "Subject," and "Body." In this case, by selecting the icon for 128, the salesperson is able to use the social networking platform at the same time as sending a CRM email, without switching screens. All actions associated with the CRM embodiment have the same look and feel of an email application so as to not leave screen 200. Further, more than one field can be simultaneously used for a search to incorporate search dependencies such as AND or OR. For example, 'from,' 'attachment,' and 'subject' fields may be used together for searching through past history. In one embodiment, such combinations of fields for the purpose of search are configurable. In one embodiment, a combination of fields may be implemented using the WCD's screen as well as through additional GUIs (not shown).

In various embodiments, the system shown in FIGS. 2 through 8 can perform mining and suggestion management at different levels as follows:

ATTACHMENTS: the system can mine for relevant attachments/files etc. based on the keywords that the user inserts in various fields, for example, the "Attchmt(s)" field shown in FIGS. 3 through 7, thus, narrowing down the number of files that the user can choose from.

SUBJECT LINE: as a baseline, there can be a pre-determined set of phrases for each application suite to which a GUI, such as GUI 136, is attached. The user can pick any 'subject line' from this list. The system keeps track of the user history (associating with the user account details maintained on the cloud) and recommends/flashes suggestions by using 'context awareness' and/or the most frequently used subject line phrases.

APPLICATIONS: the system can keep track of the applications that the user employs to communicate the message and/or a piece of information sent via email. The representations for the applications would also be displayed on the screen space.

The following examples illustrate the concept and operation of overloading UI constructs. Within an email application the popular categories of information supplied such as "From," "To," "Attchmt(s)," "Subject," and "Body," can be overloaded (similar to method overloading in object oriented programming) to mean different functionalities in various contexts (on top of existing meanings in the email app) as shown in the following non-limiting examples:

"To" could mean: email destination; an address for a social networking platform, a social networking platform application, an instant messaging target, combinations of the preceding, or a search phrase that the backend gathers, people interested in a particular activity.

"From" could mean: the actual sender, the sender organization, sender's interest tag or an identification for a social networking platform.

"Attachment" may be: the body of a blog or a regular file.

"Subject" may be: a tag, a context, a phrase, a title, or a descriptor for categories.

Likewise, the system defines meanings for various aspects of an application that is suggested in-situ. This meaning establishment and mapping can user configurable and available in PC interface as well.

Referring to FIG. 1, FIG. 1 is a table showing overlap among application functionalities. Specifically, FIG. 1 shows the overlap fields associated with various applications. The following further described back-end analytics for the system. Advantageously, the system enables efficient multi-application update in one operation. The system leverages the many similarities between email, blogging, texting/instant messaging, and social networking platform applications. Input to one set of fields can be sent to related fields in the other applications in parallel or one shot (simultaneously) rather than through multiple applications. For example, input to the "To" field for an email application is related to social networking platform applications, instant messaging, and other applications, such as blogging applications.

It is possible to send the subject line, the body, tags and combinations thereof to more than one application, for example, an application that understands its input from the generic email-like "Sender". More over, in one embodiment, the user can configure and automatically check relationships and updating mechanisms though back-end analytics.

In one embodiment, the system uses Natural Language Processing (NLP) to determine overloaded meanings. For example, at least some processing can be done on the back end of the set of fields outlined such as "From," "To," "Attchmt(s)," "Subject," and "Body." This processing aids in the tractability and scalability of NLP. In one embodiment, other known forms of analytics are used in the cloud to aid in the generation of contextual application suggestions. Such analytics include, but are not limited to context mining, social network analysis, or activity mining from cell phone transducers. For example, social network analysis could be used for the following transitive deduction: User 1 uses app A and B. User 2 uses B and C. User 3 should be suggested B and/or C or an ordered set of the atomic applications. Advantageously, a significant amount of back-processing and bandwidth is reduced owing to aggregated updates on the part of the user. Thus, there is less screen switching on the WCD.

In one embodiment, the system includes backend-analytics for user segmentation. For example, the system can maintain a "personal log," similar to history 150, for the user where the information regarding the exchange of documents, files, mails, messages, social networking platform communications, and other feeds about "tags" identified by the system are saved. The information can include the communication exchange that the user made or links to the files or documents associated with the tag. For example, TAG: mobile research can be used: email exchange; social networking platform feeds; instant messaging; documents on systems; relevant files; relevant contacts; and associated links (URLs) exchanged.

In one embodiment, some or all of the analytics described above are used to design strategies for segmenting and optimizing user experience through personalization.

FIG. 9 is a flowchart for an example implementation of the CRM embodiment shown in FIG. 4 through 8. The flowchart illustrates an email-like interface with context sensitive in-situ application suggestions.

FIG. 10 is a bar graph showing usage patterns for an example salesperson in a CRM embodiment. The following provides further detail regarding a CRM embodiment. The USE CASE is sending marketing collateral/promotional material to all the customers who bought Dell Computers. The User is a salesperson. Backend analytics on the use case in this example is based the "preference signature" of Sam for the tag "Dell." FIG. 9 is essentially a plot of the preference behavior in terms of the "exchange method" that the salesperson has used to transact information pertaining to the tag "Dell". The logs include all the instances where the salesperson followed through the suggestions that the system made for them. The preference signature of the salesperson, pertaining to tag "DELL" reflects the highest usage of email.

The following provides further details regarding the analytics for overloading of UI constructs across applications. In one embodiment, an "Ensemble Update" is based on the overloading of a template according to an underlying application, such as application 106, and user workflow patterns, such as derived from histories 150 or 152. In the case of a CRM system, the template is overloaded across applications depending on which fields in the application the user actually makes use of when using various applications such as email and social networking platform applications.

The following is a description of an embodiment for Incident Management—Change Management, for example, problem tickets and Service Level Agreement (SLA) tracking USE CASE—User wants to track and update the status of a problem ticket. User: Administrator. Backend analytics on the use case in this example is based the tag "Change Request Number QWER123." The system analyzes preference behavior in terms of the "exchange method" that the Administrator has used to transact information pertaining to the tag "Change Request Number QWER123." The logs include all the instances where the Administrator followed through the suggestions that the system made for them. The preference signature of the Administrator, pertaining to tag "Change Request Number QWER123" reflects the highest usage of sharepoint to exchange the related tag information.

The following provides further details regarding the analytics for overloading of UI constructs across applications. In one embodiment, an "Ensemble Update" is based on the overloading of a template according to an underlying application, such as application 106, and user workflow patterns, such as derived from histories 150 or 152. In the case of an Incident Management system, the template is overloaded depending on which fields the user actually makes use of when using different applications, such as email or Sharepoint. For example, social networking platform applications may not be overloaded if the Administrator does not use these applications as a means of information exchange (APPLICATION CONTEXT) and no user patterns reflecting the use of any other applications for exchange has been tracked by the system to date (USING HISTORY).

The following is a description of an embodiment for a HealthCare Document Exchange embodiment. USE CASE: User wants to send prescriptions and health records of a patient to another healthcare facility. User: Doctor/Pharmacist. Backend analytics on the use case in this example is based the "preference signature" of the Doctor/Pharmacist for the tag "Patient Record PR 2345." The system analyzes preference behavior in terms of the "exchange method" that the Doctor/Pharmacist has used to transact information pertaining to the tag "Patient Record PR 2345." The logs include all the instances where the Doctor/Pharmacist followed through the suggestions that the system made for them. The preference signature of the Doctor/Pharmacist, pertaining to tag "Patient Record PR 2345" reflects the highest usage of email to exchange the related patient information.

The following provides further details regarding the analytics for overloading of UI constructs across applications. In one embodiment, an "Ensemble Update" is based on the overloading of a template according to an underlying application, such as application 106, and user workflow patterns, such as derived from histories 150 or 152. In the case of a HealthCare Record Exchange system, the template is overloaded depending on which fields the user actually made use of when using different applications such as email or Sharepoint. For example, in the HealthCare Document Exchange Embodiment:

Social networking platform applications are not overloaded because they are not used as a means of exchange.

The attributes/fields for Instant Messaging allow the user to send attachments.

The system can be customized to adapt to any in-house applications that the hospital might already be using.

FIGS. 11A-11D are a flowchart of a method of implementing simultaneously functionality using a single screen of a graphical user interface for a device. Step 300 displays, on a screen of a graphical user interface (GUI) for a wireless communications device (WCD) and using a processor for a first specially programmed computer in the WCD, a visual representation for a first application, the first application including a plurality of fields and at least one first function. Step 302 receives, via the GUI, input data for the first plurality of fields. Step 310 identifies, using a processor for a second specially programmed computer separate from the WCD, a portion of the input data usable by a second application, a first portion of the input data usable in a second application, the second application different from the first application and including at least one second function different from the at least one first function. Step 320 presents, using the processor for the first specially programmed computer, a sensory representation of the second application via the GUI while maintaining the visual representation on the screen. Step 332 populates, using the processor for the second specially programmed computer, the second application with the portion of the input data. Step 346 receives, via the GUI and while maintaining the first visual representation on the screen, an input selecting the second application. Step 350 receives, via the GUI and while maintaining the first visual representation on the screen, a command to implement the first and second applications. Step 356 implements, using the processor for the second specially programmed computer, the first and second applications.

In one embodiment, Step 360 simultaneously transmits the input data and the first portion of the input data. In one embodiment, Step 306, accesses, using the second processor, a first history of interactions of a user with the first or second application; or accesses, using the second processor, a second history of data usage by the first or second application. Step 308 accesses, using the second processor, respective histories of interactions of a plurality of users with the first or second application; or accesses, using the second processor, a history of data usage by the first or second application. Step 312 identifies the first portion of the input data using the first or second history or the respective histories.

In one embodiment, Step 330 selects, using the second processor, the first portion of the input data, and respective descriptions of how the first and second applications work, additional data applicable to the second application; and Step 334 populates, using the second processor, the second application with the additional data. In one embodiment, Step 354 modifies, using the second processor, the at least one first function to create the at least one second function. In one embodiment, in Step 314, the at least one first and second functions operate differently on the first portion of the input data.

In one embodiment, Step 316 identifies, using the second processor and responsive to the second application, a second portion of the input data usable in a third application. Step 322 presents, using the second processor, a second sensory representation of the third application via the GUI while maintaining the first visual representations on the screen. Step 336 populates, using the second processor, the third application with the second portion of the input data. Step 348 receives, via the GUI, an input selecting the third application while maintaining the first visual representation on the screen. Step 352 receives, via the GUI, a command to implement the third application. Step 358 implements, via the second processor, the third application.

In one embodiment, Step 318 identifies, using the second processor and responsive to the first portion of the input data, the first application, or the second application, a segment of data stored in a datafile. Step 324 presents a second sensory representation of the second application via the GUI while maintaining the first visual representation on the screen. Step 338 populates, using the second processor, the second application with the first portion of the input data. In one embodiment, Step 326 modifies, using the second processor, the first portion of the input data. Step 340 populates, using the second processor, the second application with the modified first portion of the input data.

In one embodiment, Step 304 receives, in a temporal sequence and via the GUI, respective portions of the input data for the first plurality of fields while maintaining the display of the first visual representation on the screen. Step 328 identifies, in the temporal sequence and using the second processor, respective fields from the second plurality of fields in which the respective portions of input data are usable. Step 342 populates, in the temporal sequence and using the second processor, the respective fields from the second plurality of fields with the respective portions of input data. Step 344 presents, in the temporal sequence, sensory representations of the respective fields from the second plurality of fields via the GUI while maintaining the display of the first visual representation on the screen.

Advantages of the system and method of the present disclosure include, but are not limited to, maintaining an initial display in a single screen, not needing to leave the screen to access additional applications, and posting updates to different application simultaneously and dynamically, which enhances performance, particularly for a WCD. Thus, multiple applications are accommodated on a single screen as opposed to be restricted to a separate screen for each application, which results in time consuming, bandwidth consuming, and inefficient switching between respective screens.

Currently, email applications are the most widely used applications for mobile enterprise embodiments, for example, for use with WCDs. This usage poses a problem for the adoption newer applications in the enterprise. Advantageously, instead of contesting with email applications, the present disclosure leverages the strengths of email applications (especially in mobile environments) to include newer applications that are struggling to gain a foothold. For example, the present disclosure describes context-sensitive application suggestions, which can include user configurable overloading, delivered in an in-situ fashion. Thus, other applications are usable within an initial application such as email without the need for switching between respective screens for the various applications.

Because a plurality of applications are simultaneously accessible and usable, for example, email, instant messaging, and social networking platform applications, cross-application preferences and patterns can be determined for users. Such determination offers a new space for analytics can be stored and monetized through personalization. Further, using multiple applications together can provide an ensemble update capability that provides data transmission efficiencies.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-based system for implementing simultaneously functionality using a single screen of a graphical user interface (GUI) for a wireless communications device (WCD), comprising:
   a first processor for a first specially programmed computer in the WCD for:
      displaying, on the single screen of the GUI, a first visual representation for a first application, the first application including:
         a first plurality of fields; and,
         at least one first function;
      receiving input data for the first plurality of fields via the GUI; and,
   a second processor for a second specially programmed computer, located separate from the WCD, for:
      identifying a first portion of the input data usable in a second application, the second application different from the first application and including at least one second function different from the at least one first function;
      accessing a history of data usage by the first application;
      analyzing, using the second processor and back end analytics in the second processor, the history of data usage;
      modifying, using the second processor, the back end analytics, and the analysis of the history of data usage, the first portion of the input data, wherein:
   the first processor is for presenting, on the single screen of the GUI and using the first processor, a second visual representation of the second application while maintaining the first visual representation on the single screen of the GUI;
   the second processor is for populating the second application with the modified first portion of the input data;
   the first processor is for:
      receiving, via the GUI and while maintaining the first visual representation on the single screen of the GUI, an input selecting the second application; and, receiving, via the GUI and while maintaining the first and second visual representations on the single screen of the GUI, a command to implement the first and second applications; and, the second processor is for implementing the at least one first and second functions.

2. The system of claim 1 wherein the second processor is for:

selecting, using the first portion of the input data and respective descriptions of how the first and second applications work, additional data applicable to the second application; and, populating the second application with the additional data.

3. The system of claim 1 wherein the at least one first and second functions operate differently on the first portion of the input data.

4. The system of claim 1 wherein the second processor is for:

identifying, responsive to the second application, a second portion of the input data usable in a third application;

presenting a sensory representation of the third application via the GUI while maintaining the first visual representations on the screen;

populating the third application with the second portion of the input data;

receiving, via the GUI, an input selecting the third application while maintaining the first visual representation on the screen;

receiving, via the GUI, a command to implement the third application; and, implementing the third application.

5. The system of claim 1 wherein the second processor is for:

identifying, responsive to the second application, a second portion of the input data usable in a third application;

presenting a sensory representation of the third application via the GUI while maintaining the first visual representations on the screen; and, populating the third application with the second portion of the input data.

6. The system of claim 1 wherein the first processor is for:

displaying the first visual representation on a first portion of the screen; and, presenting the second visual representation on a second portion of the screen different from the first portion.

7. The system of claim 1 wherein the second processor is for:

accessing a first history of interactions of a user with the first or second application; or accessing a second history of data usage by the first or second application, wherein identifying the first portion of the input data usable by the second application includes using the first or second history.

8. The system of claim 1 wherein the second processor is for:

accessing respective histories of interactions of a plurality of users with the first or second application; or accessing a history of data usage by the first or second application, wherein identifying the first portion of the input data usable by the second application includes using the respective histories or the history.

9. The system of claim 1 wherein the second processor is for:

identifying a respective portion of the input data usable by each application from a plurality of applications;

presenting, via the GUI, a respective sensory representation of said each application while maintaining the display of the first visual representation on the screen; and, populating the plurality of applications with the respective portions of the input data prior to receipt, via the GUI, of an input selecting an application from the plurality of applications.

10. The system of claim 1 wherein the second processor is for:

identifying a respect portion of the input data usable by each application from a plurality of applications;

presenting, via the GUI, a respective sensory representation of said each application while maintaining the display of the first visual representation on the screen;

populating said each application with the respective portion of the input data;

receiving, via the GUI, respective inputs selecting said each application from a plurality of applications while maintaining the display of the first visual representation on the screen; and, implementing, via the processor, each said application.

11. The system of claim 1 wherein the second processor is for:

modifying the first portion of the input data; and, populating the second application with the modified first portion of the input data.

12. The system of claim 1 wherein:

the second application includes a second plurality of fields: and, the second processor is for:

receiving, in a temporal sequence and via the GUI, respective portions of the input data for the first plurality of fields while maintaining the display of the first visual representation on the screen;

identifying, in the temporal sequence, respective fields from the second plurality of fields in which the respective portions of input data are usable;

populating, in the temporal sequence, the respective fields from the second plurality of fields with the respective portions of input data; and, presenting, in the temporal sequence, sensory representations of the respective fields from the second plurality of fields via the GUI while maintaining the display of the first visual representation on the screen.

13. The system of claim 1 wherein the first application is an email application.

14. The system of claim 1 wherein the first or second applications are an email application, a blog application, a text message application, an instant messaging application, or a social networking platform application.

* * * * *